(12) United States Patent
Jung

(10) Patent No.: US 11,563,363 B2
(45) Date of Patent: Jan. 24, 2023

(54) MOTOR FOR VEHICLE

(71) Applicant: HYUNDAI MOBIS Co., Ltd., Seoul (KR)

(72) Inventor: Jae Woo Jung, Daegu (KR)

(73) Assignee: Hyundai Mobis Co., Ltd., Seoul (KR)

( * ) Notice: Subject to any disclaimer, the term of this patent is extended or adjusted under 35 U.S.C. 154(b) by 185 days.

(21) Appl. No.: 17/151,584

(22) Filed: Jan. 18, 2021

(65) Prior Publication Data

US 2021/0135556 A1 May 6, 2021

Related U.S. Application Data

(62) Division of application No. 16/018,065, filed on Jun. 26, 2018, now Pat. No. 11,159,078.

(30) Foreign Application Priority Data

Oct. 31, 2017 (KR) .......................... 10-2017-0143827

(51) Int. Cl.
| | | |
|---|---|---|
| *H02K 21/14* | (2006.01) | |
| *H02K 5/04* | (2006.01) | |
| *H02K 1/28* | (2006.01) | |
| *H02K 1/278* | (2022.01) | |
| *H02K 21/16* | (2006.01) | |
| *H02K 99/00* | (2014.01) | |

(52) U.S. Cl.
CPC ............ *H02K 21/14* (2013.01); *H02K 1/278* (2013.01); *H02K 1/28* (2013.01); *H02K 5/04* (2013.01); *H02K 21/16* (2013.01); *H02K 99/20* (2016.11)

(58) Field of Classification Search
CPC ........ H02K 21/14; H02K 21/16; H02K 21/22; H02K 1/278; H02K 1/28; H02K 5/04; H02K 7/003; H02K 16/04; H02K 99/20
See application file for complete search history.

(56) References Cited

U.S. PATENT DOCUMENTS

| 9,369,013 B2 | 6/2016 | Jang et al. |
| 2013/0293037 A1 | 11/2013 | Sakamoto et al. |
| 2014/0346920 A1* | 11/2014 | Dreher ................. H02K 15/022 310/216.091 |

FOREIGN PATENT DOCUMENTS

| JP | 2013-236534 | 11/2013 |
| KR | 10-2006-0133865 | 12/2006 |
| KR | 10-2007-0040913 | 4/2007 |
| KR | 10-1221135 | 1/2013 |

OTHER PUBLICATIONS

Notice of Allowance dated Nov. 1, 2018, issued in Korean Patent Application No. 10-2017-0143827.

(Continued)

*Primary Examiner* — Emily P Pham
(74) *Attorney, Agent, or Firm* — H.C. Park & Associates, PLC

(57) ABSTRACT

A motor for a vehicle may include: a shaft member rotatably installed; a magnet attached to the outside of the shaft member; a cover covering the magnet, and fixing the magnet on the shaft member; and a stator disposed outside the cover and the magnet. A distance between the cover and the stator may be equal to a distance between the magnet and the stator.

6 Claims, 14 Drawing Sheets

(56) References Cited

OTHER PUBLICATIONS

Non-Final Office Action dated Nov. 27, 2020, issued to U.S. Appl. No. 16/018,065.
Notice of Allowance dated Jun. 23, 2021, issued to U.S. Appl. No. 16/018,065.
Notice of Allowance dated Sep. 20, 2022, issued to U.S. Appl. No. 17/151,578.

* cited by examiner

MOTOR FOR VEHICLE

CROSS-REFERENCES TO RELATED APPLICATIONS

This application is a Divisional of U.S. patent application Ser. No. 16/018,065, filed on Jun. 26, 2018, which claims priority from and the benefit of Korean Patent Application No. 10-2017-0143827, filed on Oct. 31, 2017, which is hereby incorporated by reference for all purposes as if set forth herein.

BACKGROUND

Field

Exemplary embodiments relate to a motor for a vehicle, and more particularly, to a motor for a vehicle, which can improve torque density and reduce the weight.

Discussion of the Background

In general, a motor includes a stator around which a coil for generating magnetism using electricity is wound, and a rotor rotated by a mutual electromagnetic force with the stator. The rotor has a permanent magnet installed therein.

The motor is classified into a surface mounted permanent magnet (SPM) motor and an interior permanent magnet (IPM) motor, depending on the structure of the rotor or the position of the permanent magnet disposed in the rotor.

In the permanent magnet motor, when a current is applied to the coil, the rotor may be rotated by an interaction between a rotating magnetic field generated through the structure of the stator and a magnetic flux generated through the permanent magnet installed in the rotor. Then, while the rotor is rotated at a synchronous speed, magnetic torque is generated by the permanent magnet, and reluctance torque is generated by the structure of the rotor.

In the conventional SPM motor, the permanent magnet is covered with molding. The molding may increase a distance between the permanent magnet and the stator, that is, an air gap, thereby reducing torque density.

The related art is disclosed in Korean Patent Publication No. 10-2007-0040913 published on Apr. 18, 2007 and entitled "Stator for motor".

The above information disclosed in this Background section is only for enhancement of understanding of the background of the invention and, therefore, it may contain information that does not constitute prior art.

SUMMARY

Exemplary embodiments of the invention provide a motor for a vehicle, in which a distance between a cover and a stator is set to a distance between a magnet and the stator, in order to increase torque density.

In one embodiment, a motor for a vehicle may include: a shaft member mounted for rotation; a magnet attached to the outside of the shaft member; a cover disposed over the magnet, and fixing the magnet on the shaft member; and a stator disposed outside the cover and the magnet. A distance between the cover and the stator may be equal to a distance between the magnet and the stator.

A distance from the center of the shaft member to the outer surface of the cover may be larger than a distance between the center of the shaft member and the outer surface of the magnet.

The stator may include: a first stator disposed outside and facing the cover; and a second stator coupled to the first stator, disposed outside the magnet, and having a distance adjustment member protruding toward the shaft member.

The first stator and the second stator may be stacked and coupled to each other.

The cover may be disposed over one end of the magnet in the axial direction of the shaft member and another end of the magnet, facing the one end.

The shaft member may have a separation prevention member formed in a groove shape along the outer surface thereof, such that the cover is put on the shaft member, and the cover may have a protrusion seated in the separation prevention member.

The shaft member may have a plurality of insertion grooves to fix the position of the cover, and the cover may have a protruding insertion member corresponding to the shape of the plurality of insertion grooves and inserted into the plurality insertion grooves.

The plurality of insertion grooves may be arranged at equal angles, and the plurality of protruding insertion members may be formed so as to correspond to the plurality of insertion grooves.

In another embodiment, a motor for a vehicle may include: a shaft member having an outer surface and being mounted for rotation; a magnet attached to the outer surface of the shaft member; a cover disposed over the magnet, and fixing the magnet to the shaft member; and a stator disposed outside the cover and the magnet. The stator may include: a first stator disposed outside and facing the cover; and a second stator coupled to the first stator, disposed outside the magnet, and having a distance adjustment member protruding toward the shaft member. The first stator may include: a first stator body facing the cover; and an interference prevention member extended from the first stator body, and brought in contact with the second stator while facing the magnet. A distance between the cover and the first stator body may be equal to a distance between the magnet and the second stator, and a distance between the magnet and the interference prevention member may be larger than the distance between the cover and the first stator body.

The cover may be formed through a molding process.

In another embodiment, a motor for a vehicle may include: a shaft member having an outer surface and being mounted for rotation; a rotor coupled to the outer surface of the shaft and having an outer surface; a plurality of magnets attached to the outer surface of the rotor; a cover disposed over the plurality of magnets, and fixing the plurality of magnets on the rotor; and a stator disposed outside the cover and the plurality of magnets. A distance between the cover and the stator may be equal to a distance between the cover and the plurality of magnets.

The shaft member may have a separation prevention member having a groove shape along the outer surface thereof, such that the cover is connected to the shaft member, and the cover has a protrusion seated in the separation prevention member.

The rotor may include: a first rotor having an insertion hole defined thereon, and the cover is inserted into the insertion hole; and a second rotor having substantially the same diameter as the first rotor, and having a guiding member protruding from the outer surface thereof, the guiding member serving to prevent movement of the plurality of magnets relative to each other.

The plurality of first rotors and the plurality of second rotors may be mounted, and the plurality of first and second rotors may be stacked and coupled to each other.

The plurality of magnets may be attached along the outer surface of the rotor part, and form a plurality of end members.

The plurality of end members may be arranged in a staggered relationship and forming a predetermined angle with respect to each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
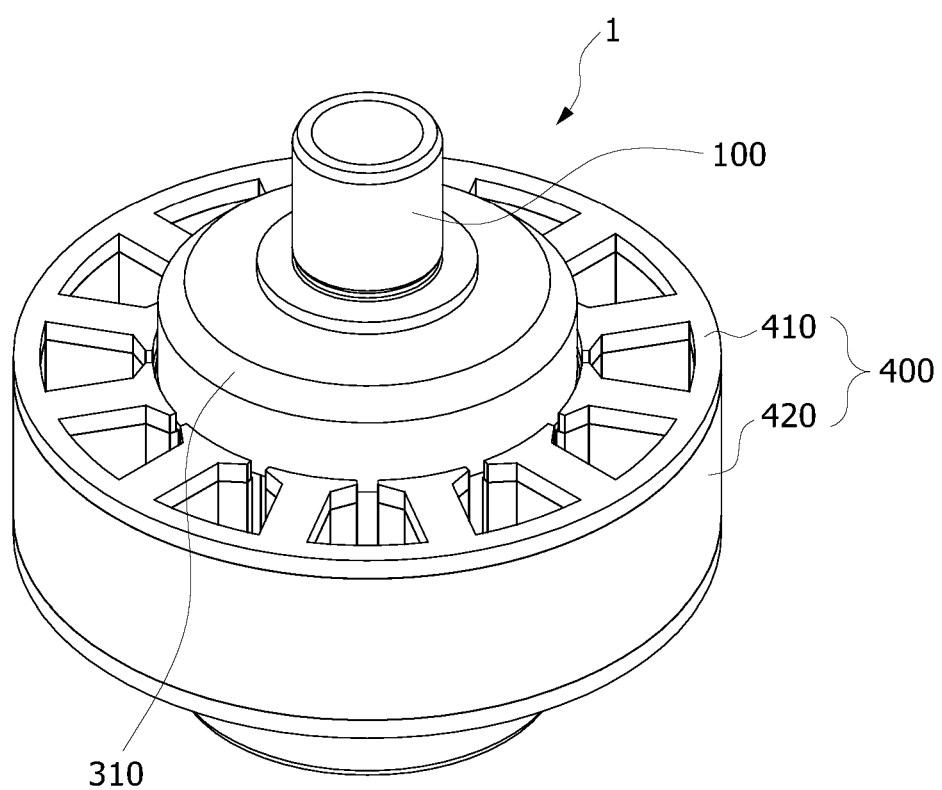
FIG. 1 is a perspective view illustrating a motor for a vehicle in accordance with a first embodiment of the invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the invention and methods accomplishing thereof will become apparent from the following description of embodiments with reference to the accompanying drawings. However, the invention is not be limited to the embodiments set forth herein but may be implemented in many different forms. The embodiments may be provided so that the disclosure of the invention will be complete, and will fully convey the scope of the invention to those skilled in the art and therefore the invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the invention will be described in more detail with reference to the accompanying drawings.

Figure 2:
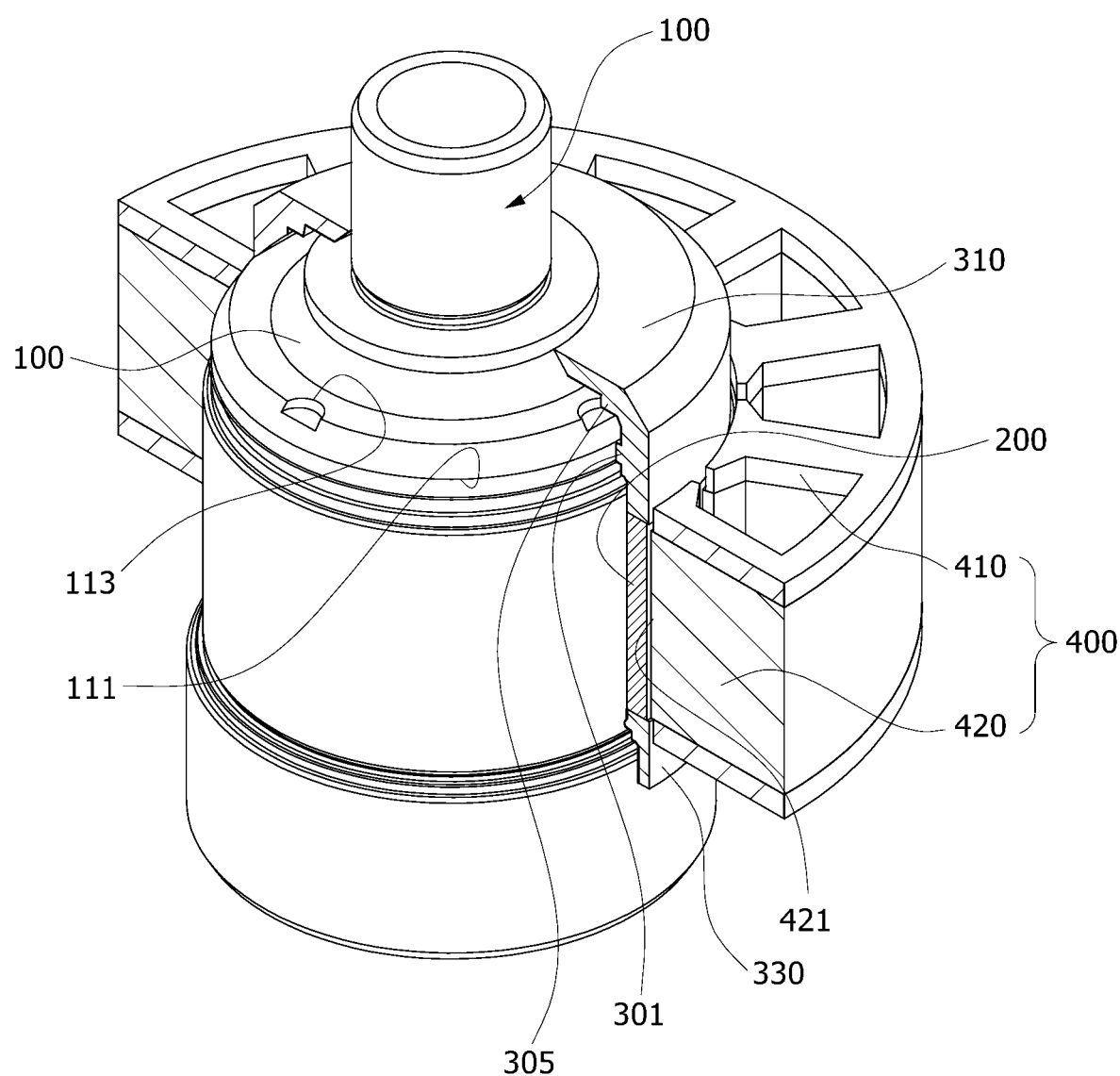
FIG. 2 is a perspective cross-sectional view illustrating the motor for a vehicle in accordance with the first embodiment of the invention.
Figure 3:
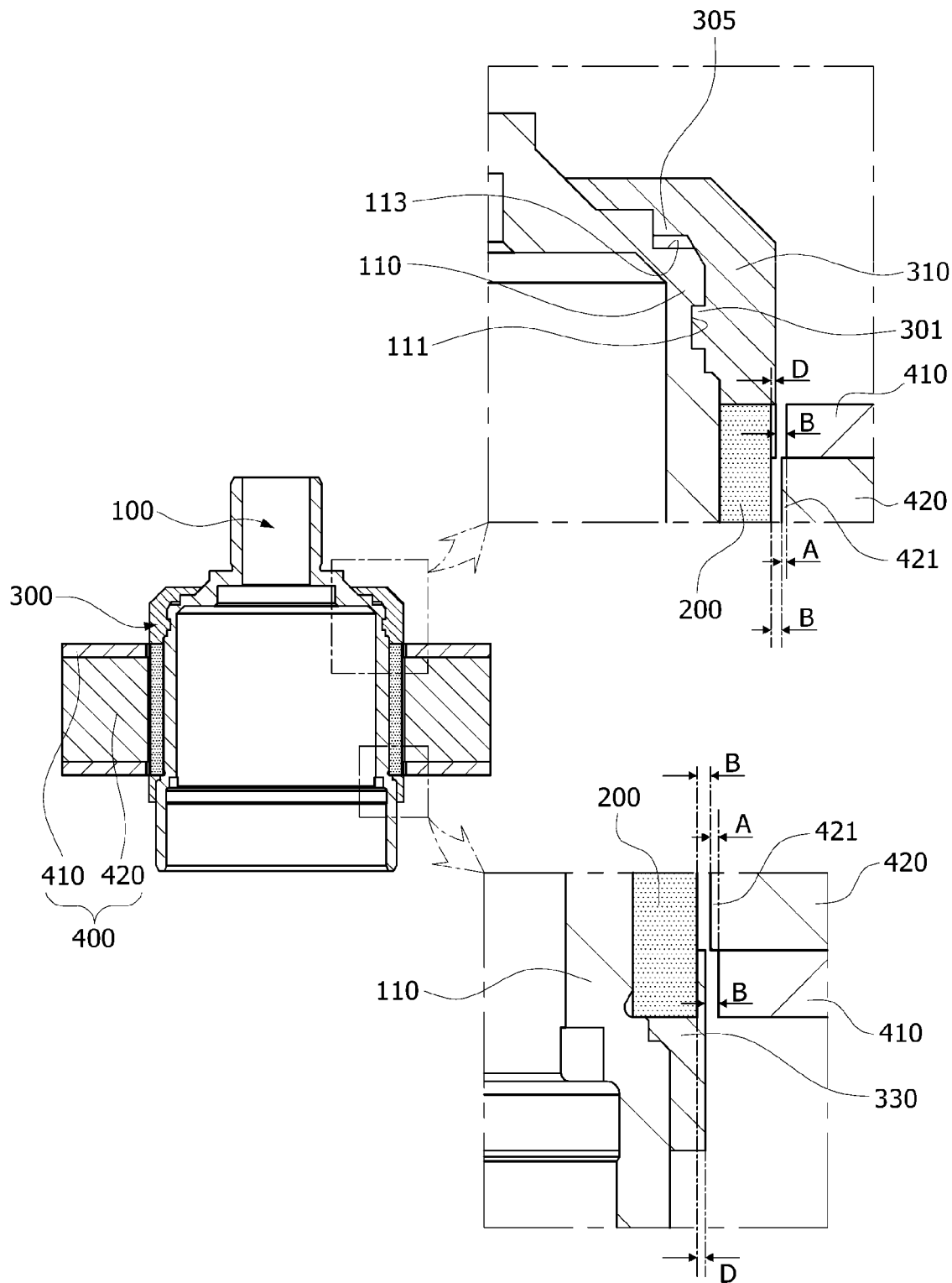
FIG. 3 is a front cross-sectional view illustrating the motor for a vehicle in accordance with the first embodiment of the invention.
Figure 4:
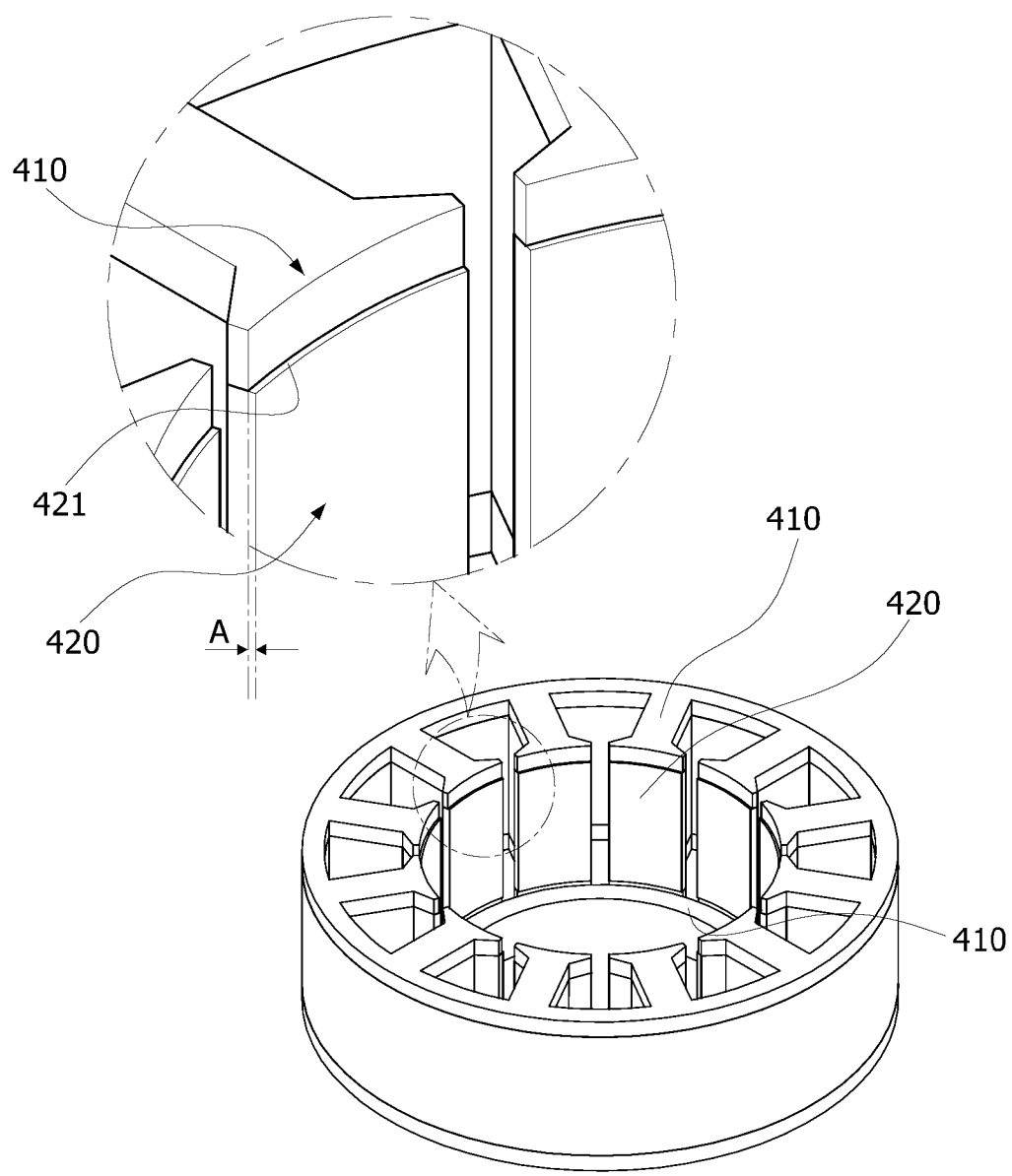
FIG. 4 is a perspective view illustrating a stator in accordance with the first embodiment of the invention.
Figure 5:
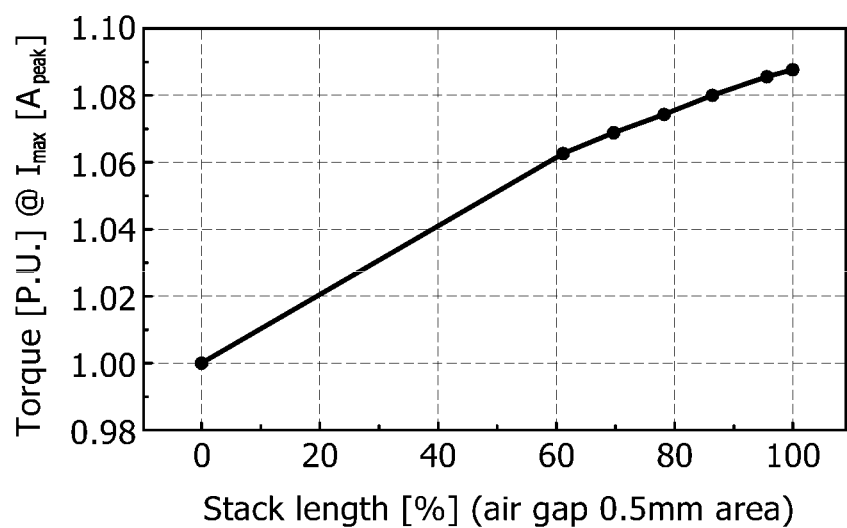
FIG. 5 is a table showing torque density depending on an air gap ratio.

FIG. 1 is a perspective view illustrating a motor for a vehicle in accordance with a first embodiment of the invention. FIG. 2 is a perspective cross-sectional view illustrating the motor for a vehicle in accordance with the first embodiment of the invention. FIG. 3 is a front cross-sectional view illustrating the motor for a vehicle in accordance with the first embodiment of the invention. FIG. 4 is a perspective view illustrating a stator in accordance with the first embodiment of the invention. FIG. 5 is a table showing torque density depending on an air gap ratio.

Referring to FIGS. 1 to 4, the motor 1 for a vehicle in accordance with the first embodiment of the invention may include a shaft member 100, a magnet 200, a cover 300 and a stator 400. In the motor 1 for a vehicle in accordance with the first embodiment of the invention, a rotor 120 described later may be omitted.

Referring to FIGS. 1 to 3, the shaft member 100 in accordance with the first embodiment of the invention may be rotatably installed, and the magnet 200 may be attached to the outside of the shaft member 100.

The shaft member 100 may have a separation prevention member 111 formed in a groove shape, such that the cover 300 is put on along the outside of the shaft member 100.

The cover 300 or specifically a first cover 310 may have a protrusion 301 formed thereon, the protrusion 301 being seated in the separation prevention member 111. As the locking part 301 is seated in the separation prevention member 111, the cover 300 and the magnet 200 coupled to the cover 300 can be prevented from separating from each other in the top-to-bottom direction (based on FIG. 2).

Thus, the cover 300 or specifically the locking part 301 of the first cover 310 may protrude toward the shaft member 100 so as to be seated in the separation prevention member 111. The locking part 301 may prevent the cover 300 and the magnet 200 from separating from each other in the top-to-bottom direction (based on FIG. 2).

In addition, when the magnet 200 is moved in the top-to-bottom direction, a distance between the cover 300 and the stator 400 or a distance between the magnet 200 and the stator 400 in the side-to-side direction (based on FIG. 2), that is, an air gap may be out of a preset range. However, since the locking part 301 can prevent the air gap from being out of the preset range, it is possible to maintain the performance of the motor while retaining the torque density.

Referring to FIGS. 2 and 3, the shaft member 100 in accordance with the first embodiment of the invention may have an insertion groove 113 for fixing the position of the cover 300. The cover 300 or specifically the first cover 310 may have a protruding insertion member 305 corresponding to the shape of the insertion groove 113 and inserted into the insertion groove 113.

The shaft member 100 may include a plurality of insertion grooves 113 radially arranged therearound. Specifically, the plurality of insertion grooves 113 may be arranged at equal angles. The cover 300 or specifically the first cover 310 may also include a plurality of insertion parts 305 protruding therefrom, and the plurality of insertion parts 305 may be inserted in the respective insertion grooves 113 corresponding to the shape of the insertion parts 305.

Therefore, when the shaft member 100 is rotated, the cover 300 may be rotated with the shaft member 100 while fixing the position of the magnet 200.

Referring to FIGS. 2 and 3, the magnet 200 in accordance with the first embodiment of the invention may be attached to the outside of the shaft member 100, and the magnet 200 may include a permanent magnet.

The magnet 200 in accordance with the first embodiment of the invention may form a plurality of end members 250 as described later with reference to another embodiment.

Referring to FIGS. 1 to 3, the cover 300 in accordance with the first embodiment of the invention may fix the position of the magnet 200 while covering the magnet 200, and include the first and second covers 310 and 330.

The cover 300 may be coupled to the magnet 200 while covering one end (upper end based on FIG. 2) and the other end (lower end based on FIG. 2) of the magnet 200 in the axial direction of the shaft member 100.

Referring to FIG. 2, the first cover 310 may fix the position of the magnet 200 while surrounding the upper end of the magnet 200, and the second cover 330 may fix the position of the magnet 200 while covering the lower end of the magnet 200.

The cover 300 in accordance with the first embodiment of the invention may be formed through a molding method, with the magnet 200 fixed to the outside of the shaft member 100.

Thus, in the cover 300, the locking part 301 seated in the separation prevention member 111 and the insertion part 305 inserted into the insertion groove 113 may be formed through the molding method. The cover 300 may be formed through insert injection molding.

Referring to FIGS. 1 to 4, the stator 400 in accordance with the embodiment of the invention may be arranged outside the cover 300 and the magnet 200, and include first and second stators 410 and 420.

The first and second stators 410 and 420 may have different inner diameters toward the shaft member 100.

In the motor 1 for a vehicle in accordance with the first embodiment of the invention, the distance between the cover 300 and the stator 400 and the distance between the magnet 200 and the stator 400, that is, the air gaps may be formed at the same distance.

Thus, referring to FIG. 5, the ratio at which the air gaps are formed at the same distance may be increased to thereby improve torque density.

Referring to FIGS. 2 to 4, the first stator 410 in accordance with the first embodiment of the invention may be disposed outside the cover 300 while facing the cover 300. In other words, the first stator 410 may be disposed so as to face the cover 300 covering the magnet 200 or specifically the first and second covers 310 and 320.

The second stator 420 in accordance with the first embodiment of the invention may be coupled to the first stator 410, include a distance adjustment member 421 disposed outside the magnet 200 and protruding toward the shaft member 100, and have the same outer diameter as the first stator 410. The second stator 420 may be disposed so as to face a portion of the magnet 200, which is not covered by the cover 300.

Hereafter, the operation principle and effect of the motor 1 for a vehicle in accordance with the first embodiment of the invention will be described as follows.

Referring to FIGS. 1 to 5, the motor 1 for a vehicle in accordance with the first embodiment of the invention may include the shaft member 100, the magnet 200, the cover 300 and the stator 400. In the motor 1 for a vehicle in accordance with the first embodiment of the invention, from which a rotor 120 is omitted, the magnet 200 may be directly attached to the shaft member 100, such that the position thereof is fixed.

Since the magnet 200 is directly attached to the shaft member 100 and rotated, the weight, volume and size of the motor 1 can be reduced while the number of parts is reduced, which makes it possible to reduce the manufacturing cost.

The stator 400 in accordance with the first embodiment of the invention may have different inner diameters at predetermined sections in the axial direction of the shaft member 100 (the top-to-bottom direction of FIG. 3), and the distance between the cover 300 and the stator 400 and the distance between the magnet 200 and the stator 400 may be set to the same distance.

Referring to FIG. 3, the thickness of a portion of the cover 300, covering the magnet 200, may be represented by D, and a horizontal distance from the outer surface of the cover 300 covering the magnet 200 to the stator 400 or specifically the first stator 410 may be represented by B.

The sum of the thickness D and the distance B at the section where the magnet 200 is covered by the cover 300 may correspond to a magnetic air gap, and the distance B between the magnet 200 and the stator 400 or specifically the first stator 410 at the section where the magnet 200 is not covered by the cover 300 may correspond to a mechanical air gap.

Since the portion corresponding to the thickness D is not formed in the section where the magnet 200 is not covered by the cover 300, both of the magnetic air gap and the mechanical air gap of the magnet 200 may be equal to the distance B.

FIG. 5 shows that, as the ratio of the section in which the cover 300 covers the magnet 200 and the magnetic air gap is larger by the thickness D than the mechanical gap B is increased with respect to the section in which the cover 300 does not cover the magnet 200 and both of the mechanical gap and the magnetic gap are equal to the distance B, the torque density increases and the performance of the motor 1 for a vehicle is improved.

Specifically, the stator 400 may include the first and second stators 410 and 420, and the second stator 420 may be coupled to the first stator 410, and have the distance adjustment member 421 disposed outside the magnet 200 and protruding toward the shaft member 100.

The magnet 200 may be attached to the outside of the shaft member 100, and the cover 300 may be coupled to the magnet 200 while covering the upper and lower ends (based on FIG. 2) of the magnet 200, facing each other, in the axial direction of the shaft member 100. Thus, the position of the magnet 200 may be fixed outside the shaft member 100.

Referring to FIG. 3, the cover 300 in the motor 1 for a vehicle in accordance with the embodiment of the invention can fix the position of the magnet 200 by covering the magnet 200.

Referring to FIG. 5, the distance between the magnet 200 and the stator 400 may be represented by an air gap, the X-axis of the graph may indicate the ratio of a section where the air gap is maintained at a predetermine distance, with respect to the entire section of the magnet 200, and the Y-axis may indicate torque density in a predetermined section of the shaft member 100 in the axial direction, depending on the ratio of the section where the air gap is maintained at the predetermined distance.

In the motor 1 for a vehicle in accordance with the embodiments of the invention, the air gap may be set to 0.5 mm. However, the invention is not limited thereto, but the air gap may be set to various values depending on the design and performance requirement of the motor 1 for a vehicle.

FIG. 5 shows that, as the ratio of the section where the air gap is maintained at 0.5 mm increases, the torque density is improved in the motor 1 for a vehicle in accordance with the embodiments of the invention.

Referring to FIG. 3, the outer surface of the cover 300 may protrude to the outside further than the outer surface of the magnet 200 because the cover 300 covers the magnet 200. Thus, when the stator has the same inner diameter across the entire section of the shaft member 100 in the axial direction, the air gap may be differ depending on the sections.

Referring to FIG. 3, the thickness A of the distance adjustment member 421 protruding toward the shaft member 100 from the inner surface of the second stator 420 may be set to a value corresponding to the thickness D of the portion of the cover 300, which covers the magnet 200.

In the motor 1 for a vehicle in accordance with the embodiment of the invention, the thicknesses A and D may be set to 0.3 mm. However, the invention is not limited thereto, and the thicknesses A and D may be set to various values depending on the design and performance requirement of the motor 1 for a vehicle.

The distance between the cover 300 or specifically the first and second covers 310 and 330 and the first stator 410 and the distance between the magnet 200 and the second stator 420, that is, the mechanical gap may be set to the same value of 0.5 mm.

Since the distance between the cover 300 and the stator 400 and the distance between the magnet 200 and the stator 400 are set to the same value, the ratio of the section where the air gap is maintained at the same distance can be increased while the torque density is increased, which makes it possible to improve the performance of the motor 1 for a vehicle.

Hereafter, the configuration, operation principle and effect of a motor 1 for a vehicle in accordance with a second embodiment of the invention will be described as follows.

Figure 6:
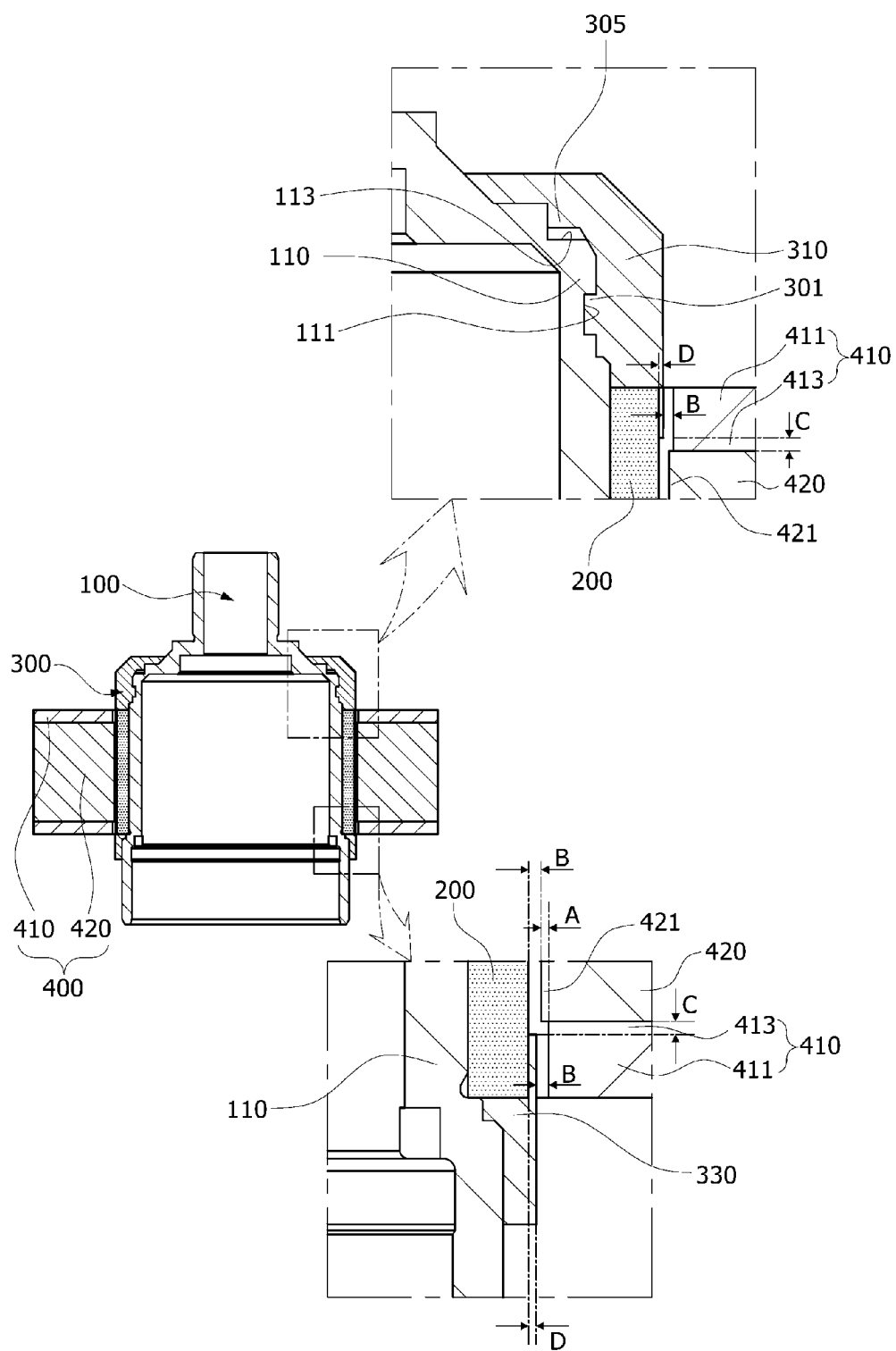
FIG. 6 is a front cross-sectional view illustrating a motor for a vehicle in accordance with a second embodiment of the invention.

FIG. 6 is a front cross-sectional view illustrating a motor for a vehicle in accordance with a second embodiment of the invention. Referring to FIG. 6, the motor 1 for a vehicle in accordance with the second embodiment of the invention may include a shaft member 100, a magnet 200, a cover 300 and a stator 400.

The stator 400 in accordance with the second embodiment of the invention may include first and second stators 410 and 420, and the first stator 410 may include a first stator body 411 and an interference prevention member 413.

Referring to FIG. 6, the first stator body 411 in accordance with the second embodiment of the invention may face the cover 300, and the interference prevention member 413 may be extended from the first stator body 411, and brought in contact with the second stator 420 while facing the magnet 200.

In the second embodiment of the invention, a distance between the cover 300 and the first stator body 411 may be equal to a distance between the magnet 200 and the second stator 420, and a distance between the magnet 200 and the interference prevention member 413 may be larger than the distance between the cover 300 and the first stator body 411.

By the interference prevention member 413, the distance adjustment member 421 may be spaced from the cover 300 or specifically the lower end (based on FIG. 6) of the first cover 310, and spaced from the upper end (based on FIG. 6) of the second cover 330.

Therefore, when the motor 1 for a vehicle is rotated, the interference prevention member 413 can remove interference between the distance adjustment member 421 and the cover 300 covering the magnet 200, thereby preventing a reduction in performance of the motor 1 for a vehicle, which may occur due to a reduction in torque density and an occurrence of noise which are caused by the interference and friction between the cover 300 and the distance adjustment member 421.

Since the other components, operation principle and effect of the motor 1 excluding the interference prevention member 413 are the same as the motor 1 for a vehicle in accordance with the first embodiment of the invention, the detailed descriptions thereof are omitted herein.

Hereafter, the configuration, operation principle and effect of a motor 1 for a vehicle in accordance with a third embodiment of the invention will be described as follows. In the motor 1 for a vehicle in accordance with the third embodiment of the invention, the magnet 200 may not be attached to the outside of the shaft member 100, but attached to the outside of a rotor 120.

Figure 7:
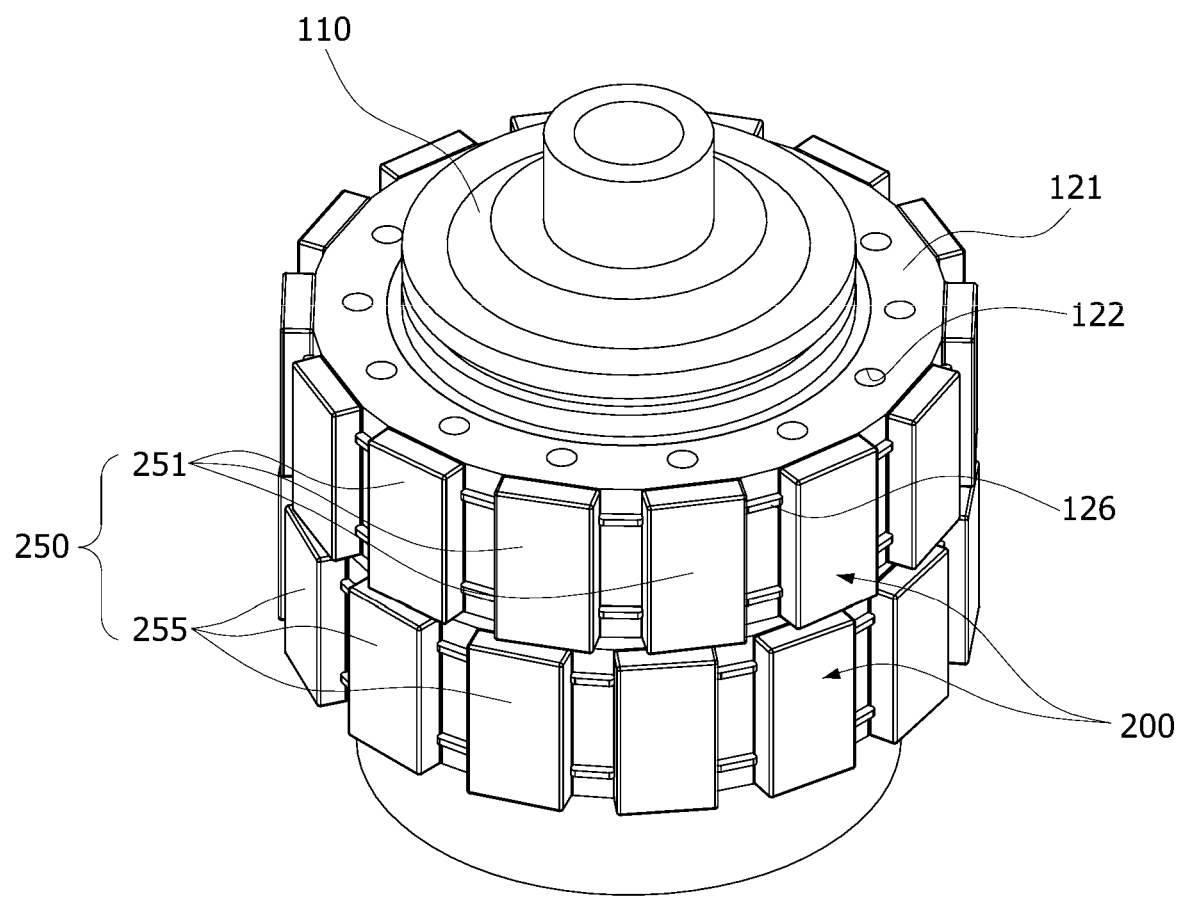
FIG. 7 is a perspective view illustrating a motor for a vehicle in accordance with a third embodiment of the invention.
Figure 8:
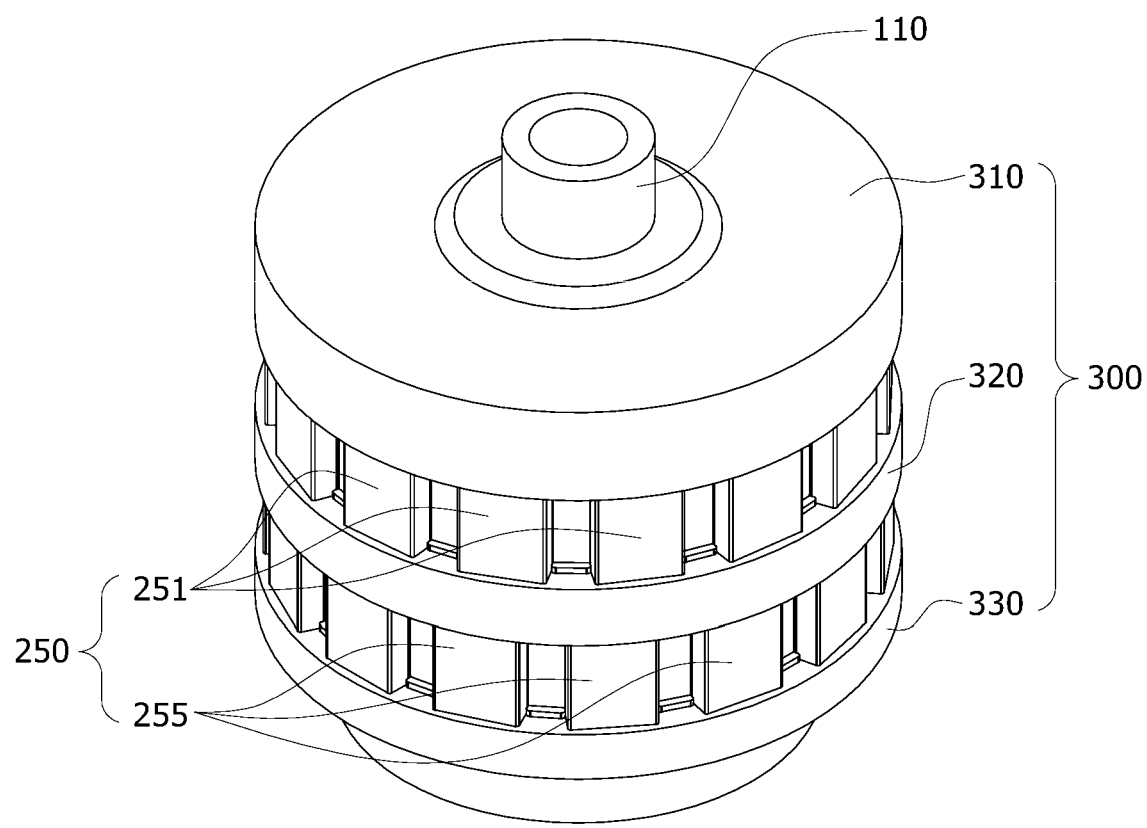
FIG. 8 is a perspective view illustrating the motor for a vehicle in accordance with the third embodiment of the invention.
Figure 9:
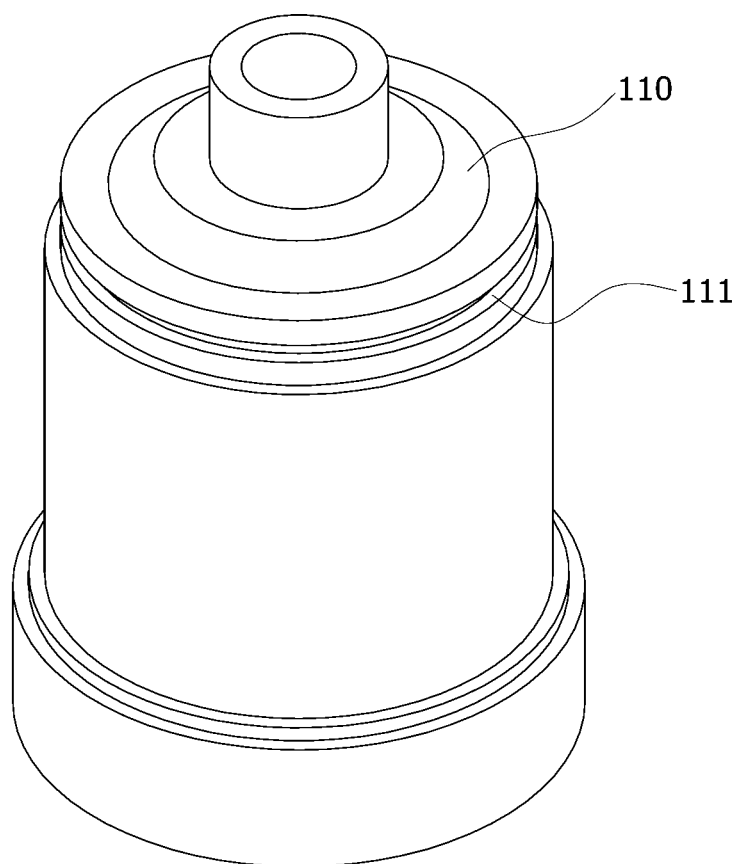
FIG. 9 is a perspective view illustrating a shaft in accordance with the third embodiment of the invention.
Figure 10:
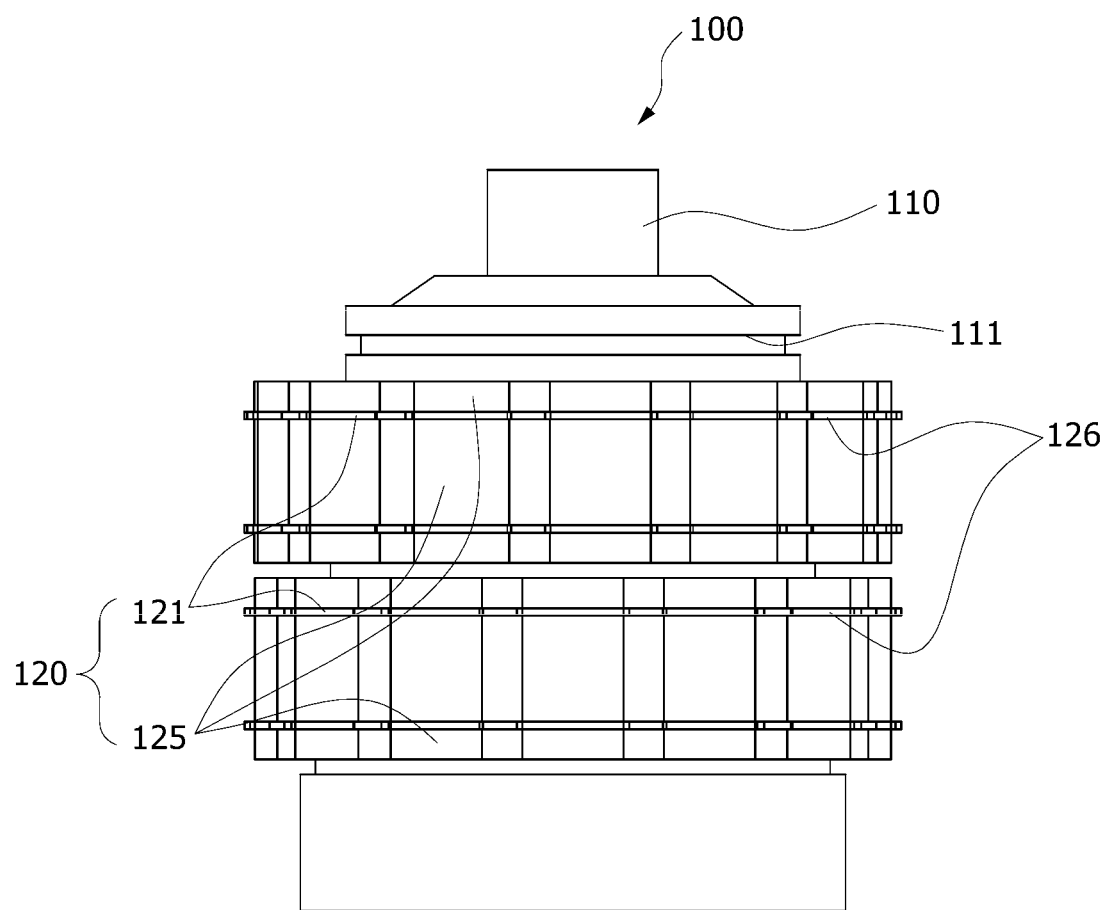
FIG. 10 is a front view illustrating the motor for a vehicle in accordance with the third embodiment of the invention.
Figure 11:
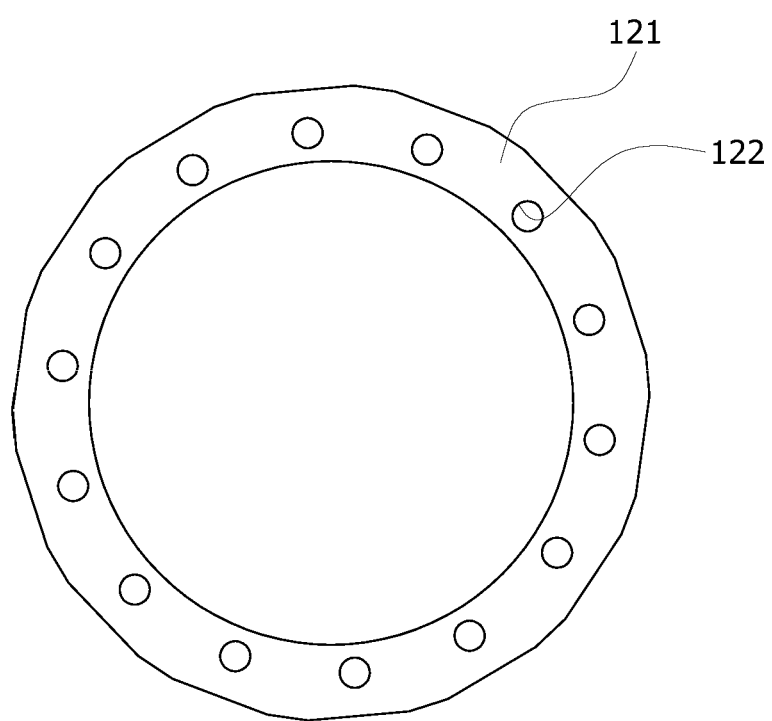
FIG. 11 is a plan view illustrating a first rotor in accordance with the third embodiment of the invention.
Figure 12:
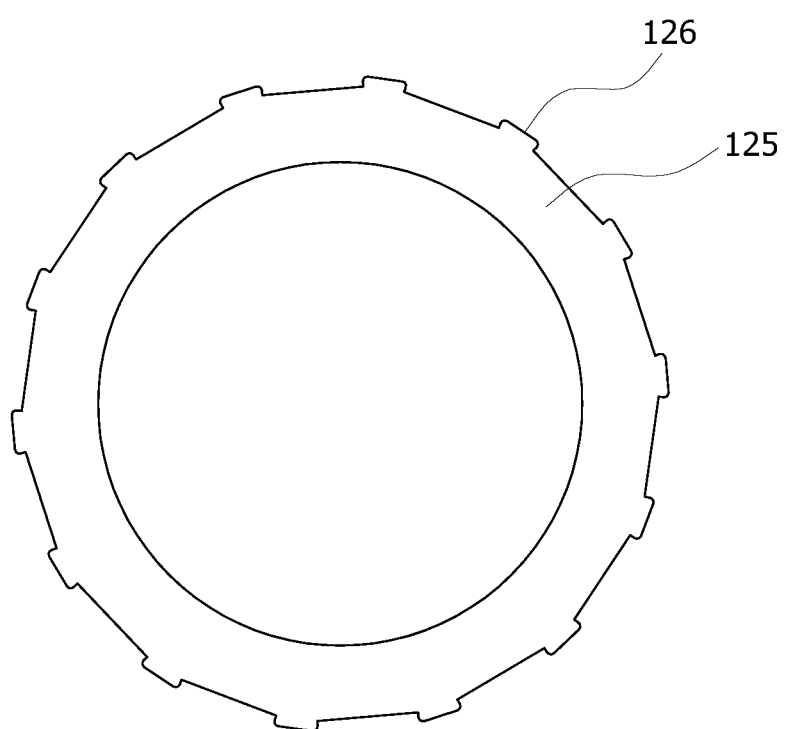
FIG. 12 is a plan view illustrating a second rotor in accordance with the third embodiment of the invention.
Figure 13:
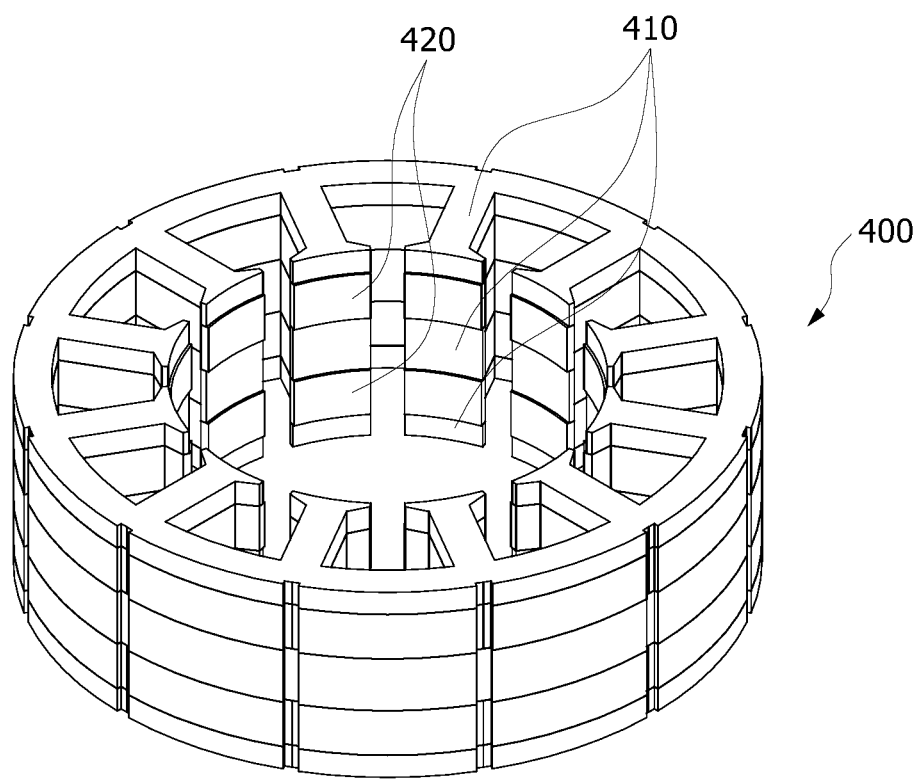
FIG. 13 is a perspective view illustrating a stator in accordance with the third embodiment of the invention.
Figure 14:
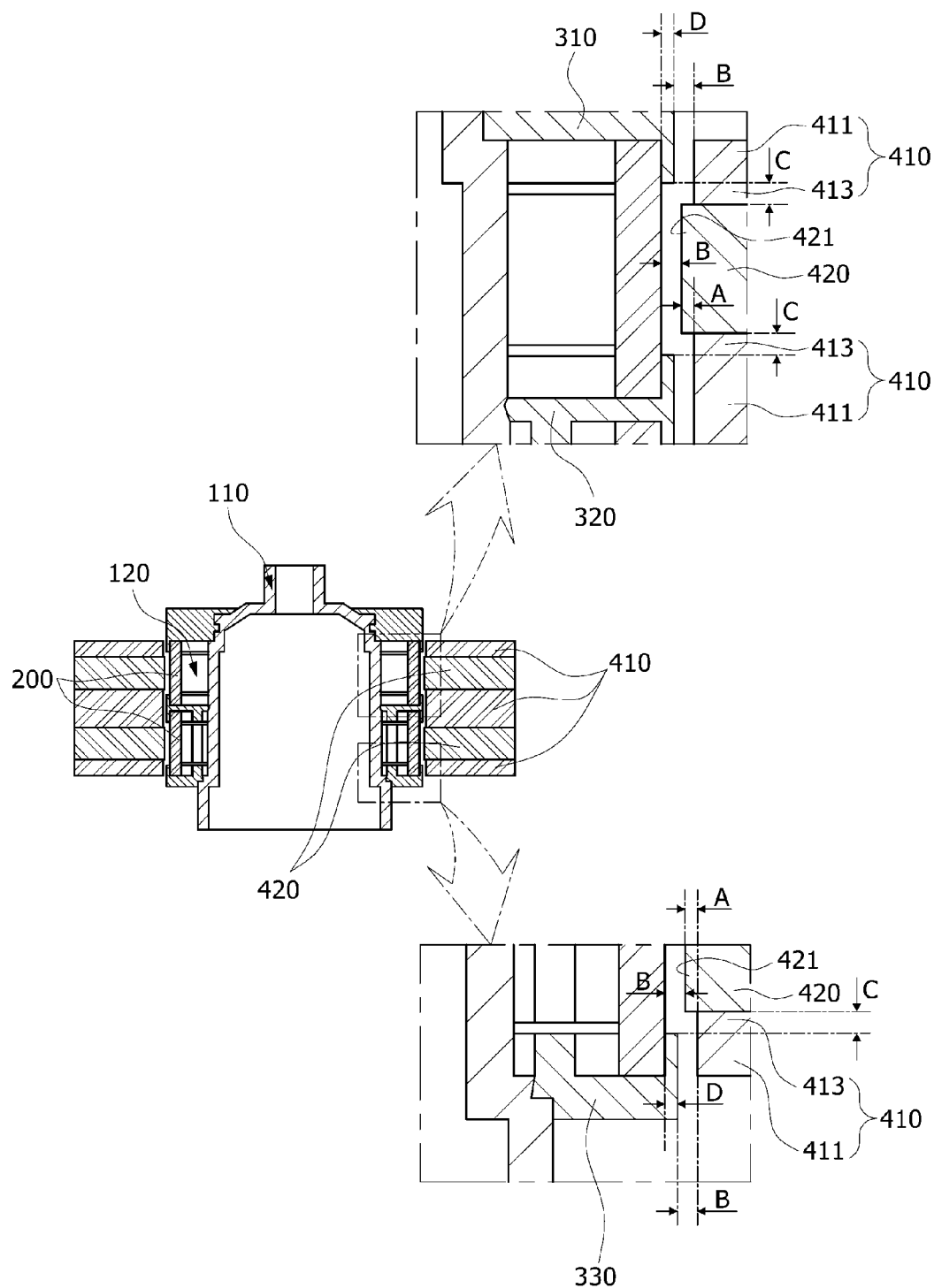
FIG. 14 is a front cross-sectional view illustrating the motor for a vehicle in accordance with the third embodiment of the invention.

FIG. 7 is a perspective view illustrating a motor for a vehicle in accordance with a third embodiment of the invention. FIG. 8 is a perspective view illustrating the motor for a vehicle in accordance with the third embodiment of the invention. FIG. 9 is a perspective view illustrating a shaft in accordance with the third embodiment of the invention. FIG. 10 is a front view illustrating the motor for a vehicle in accordance with the third embodiment of the invention. FIG. 11 is a plan view illustrating a first rotor in accordance with the third embodiment of the invention. FIG. 12 is a plan view illustrating a second rotor in accordance with the third embodiment of the invention. FIG. 13 is a perspective view illustrating a stator in accordance with the third embodiment of the invention. FIG. 14 is a front cross-sectional view illustrating the motor for a vehicle in accordance with the third embodiment of the invention.

Referring to FIGS. 7 to 13, the motor 1 for a vehicle in accordance with the third embodiment of the invention may include a shaft 110, a rotor 120, a magnet 200, a cover 300 and a stator 400.

Referring to FIGS. 7 to 13, a distance between the cover 300 and the stator 400 in accordance with the third embodiment of the invention may be equal to a distance between the cover 300 and the magnet 200. Thus, since an air gap is constantly maintained, the torque density can be increased, which makes it possible to improve the performance of the motor 1 for a vehicle.

Referring to FIGS. 7 and 10 to 12, the rotor 120 in accordance with the third embodiment of the invention may include first and second rotors 121 and 125 which are coupled to the outside of the shaft 110 and to which the magnet 200 is attached.

The first rotor 121 in accordance with the third embodiment of the invention may have an insertion hole 122 into which the cover 300 is inserted. As the first rotor 121 is coupled to the cover 300, the magnet 200 can be prevented from separating in the top-to-bottom direction (based on FIG. 6).

The second rotor 125 in accordance with the third embodiment of the invention may have the same inner diameter as the first rotor 121, and include a guiding member 126 protruding from the outside thereof so as to fix the position of the magnet 200.

Referring to FIG. 10, the rotor 120 may include a plurality of first rotors 121 and a plurality of second rotors 125, and the first and second rotors 121 and 125 may be stacked and coupled to each other. The guide parts 126 protruding to the outside can prevent the magnet 200 from moving in the side-to-side direction (based on FIG. 9), the magnet 200 being attached to the first and second rotors 121 and 125.

In addition, although the guide parts 126 may be formed across the entire section of the magnet 200 in the top-to-bottom direction (based on FIG. 10), the movement of the magnet 200 in the side-to-side direction (based on FIG. 10) can be prevented while magnetic flux leakage is reduced.

Referring to FIGS. 7, 8 and 10, the magnet 200 in accordance with the third embodiment of the invention may include a plurality of magnets attached along the outside of the rotor 120, and arranged at even intervals. The plurality of magnets 200 may form end members 250.

Referring to FIGS. 7 and 8, the end members in accordance with the third embodiment of the invention may include a plurality of first end members 251 and a plurality of second end members 255.

The plurality of first end members 251 may be attached to the outside of the rotor 120, and arranged at even intervals. The plurality of second end members 255 may be attached to the outside of the rotor 120 under the first end members 251 (based on FIG. 7), and arranged at even intervals.

Referring to FIGS. 8 and 9, the plurality of end members 250 in accordance with the third embodiment of the invention or specifically the first and second end members 251 and 255 may be arranged out of line with each other, while forming a predetermined angle in the circumferential direction of the shaft 110.

When the first and second end members 251 and 255 are arranged on the same line, cogging torque may be caused by a mutual force between the magnet 200 and the stator 400, even though power is not supplied to the motor 1 for a vehicle. However, when the first and second end members 251 and 255 are arranged out of line at the predetermined angle with respect to each other, an occurrence of cogging torque can be reduced.

Referring to FIGS. 8 and 14, the cover 300 in accordance with the third embodiment of the invention may fix the positions of the magnets 200 while covering the upper ends (based on FIG. 8) of the magnets 200 at the first end members 251, and the second cover 330 may fix the positions of the magnets 200 while covering the lower ends (based on FIG. 8) of the magnets 200 at the second end members 255.

Referring to FIGS. 8 and 14, the connection cover 320 in accordance with the third embodiment of the invention may be installed between the lower ends (based on FIG. 8) of the magnets 200 at the first end members 251 and the upper ends (based on FIG. 8) of the magnets 200 at the second end members 255, and a cover fixing part 321 may protrude downward (based on FIG. 14) so as to be inserted into the insertion hole 122 formed in the first rotor 121.

In the third embodiment of the invention, a distance between the connection cover 320 and the first stator 410 may be set to 0.5 mm. However, the invention is not limited thereto, but the distance may be set to various values depending on the design performance of the motor 1 for a vehicle.

Thus, the positions of the first and second end members 251 and 255 may be fixed so that the first and second end members 251 and 255 are arranged out of line while forming the predetermined angle with respect to each other, which makes it possible to reduce cogging torque.

Referring to FIG. 14, the upper end (based on FIG. 14) of the connection cover 320, the lower end (based on FIG. 14) of the distance adjustment member 421 of the first end part 251, the lower end (based on FIG. 14) of the connection cover 320, and the upper end (based on FIG. 14) of the distance adjustment member 421 of the second end part 255 may be spaced by the interference prevention member 413 in accordance with the third embodiment of the invention, which makes it possible to prevent interference between the connection cover 320 and the distance adjustment member 421 when the motor 1 for a vehicle is rotated.

In the motor 1 for a vehicle in accordance with the third embodiment, since the other components excluding the rotor 120, the end members 250 and the connection cover 320 have the same structures as those of the first and second embodiments, the detailed descriptions thereof are omitted herein.

In accordance with the embodiments of the invention, the distance between the cover and the stator and the distance between the magnet and the stator, that is, the air gaps can be constantly maintained to increase the torque density. Thus, the performance can be improved.

Furthermore, the distance between the cover and the stator and the distance between the magnet and the stator may be maintained at the preset distance by the distance adjustment member, and the ratio of the preset distance can be increased by the distance adjustment member, which makes it possible to increase the torque density while improving the performance.

Furthermore, since the cover covers one end of the magnet in the axial direction of the shaft member and the other end of the magnet, facing the one end, leakage magnetic flux can be reduced, compared to the structure in which the cover covers the entire section of the magnet.

Furthermore, the guiding member of the second rotor can fix the position of the magnet.

Furthermore, since the guiding member is formed only at the predetermined section of the magnet in the axial direction of the shaft member, leakage magnetic flux can be reduced, compared to the structure in which the guiding member is formed across the entire section of the magnet.

Furthermore, since the plurality of end members are arranged out of line while forming the predetermined angle, cogging torque can be reduced.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A motor for a vehicle, comprising:
    a shaft member having an outer surface and being mounted for rotation;
    a rotor coupled to the outer surface of the shaft member and having an outer surface;
    a plurality of magnets attached to the outer surface of the rotor;
    a cover disposed over the plurality of magnets, and fixing the plurality of magnets on the rotor; and
    a stator disposed outside the cover and the plurality of magnets,
    wherein a distance between the cover and the stator is equal to a distance between the cover and the plurality of magnets.

2. The motor of claim 1, wherein the shaft member comprises a separation prevention member having a groove shape along the outer surface thereof, such that the cover is connected to the shaft member, and
    the cover comprises a protrusion seated in the separation prevention member.

3. The motor of claim 1, wherein the rotor comprises:
    a first rotor having an insertion hole defined thereon, and the cover is inserted into the insertion hole; and
    a second rotor having substantially the same diameter as the first rotor, and comprising a guiding member protruding from an outer surface of the second rotor, the guiding member preventing movement of the plurality of magnets relative to each other.

4. The motor of claim 3, wherein the first rotor and the second rotor are mounted, and the first rotor and the second rotor are stacked and coupled to each other.

5. The motor of claim 1, wherein the plurality of magnets are attached along the outer surface of the rotor, and form a plurality of end members.

6. The motor of claim 5, wherein the plurality of end members are arranged in a staggered relationship and form a predetermined angle with respect to each other.

\* \* \* \* \*